Oct. 7, 1952
C. K. MORGAN ET AL
2,612,953
PACKER
Filed May 4, 1946
2 SHEETS—SHEET 1
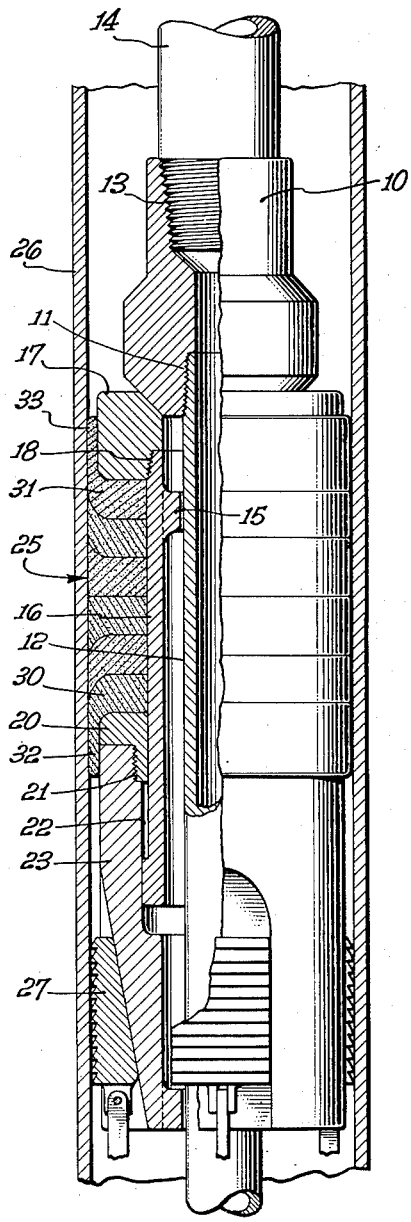
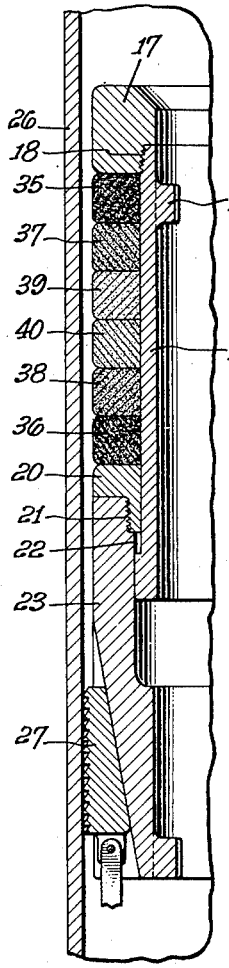
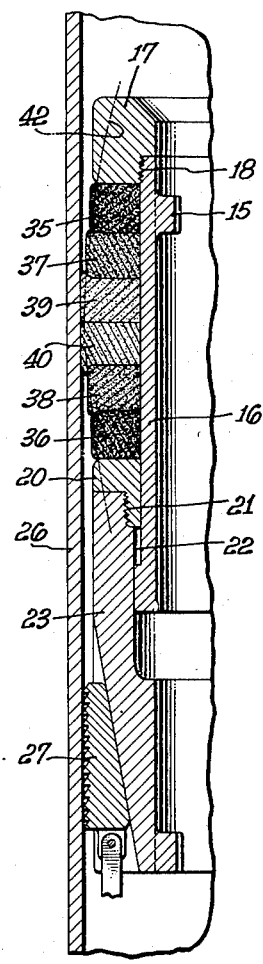
CHARLES K. MORGAN
LORRAIN D. MEDDICK
JOHN S. McKENNA
INVENTORS.
BY Lyle Willow
ATTORNEY.

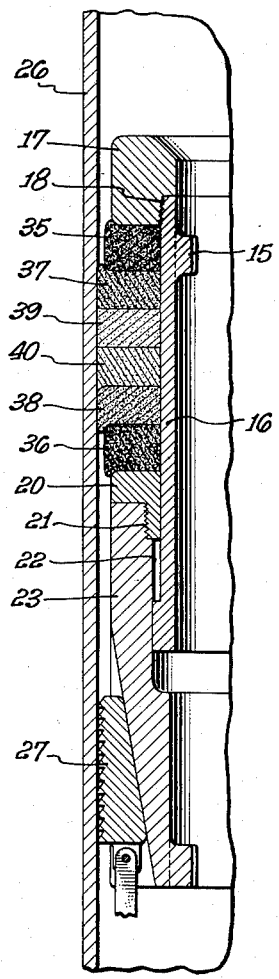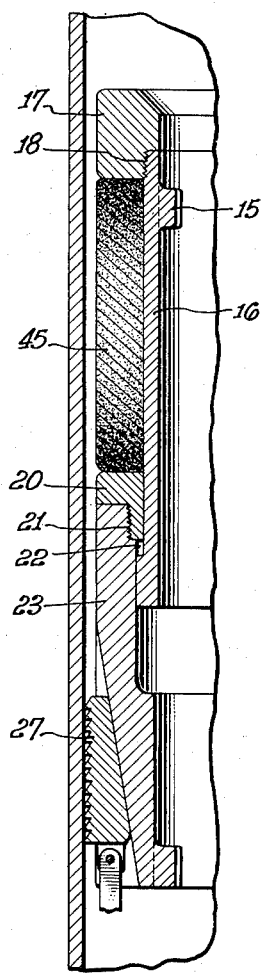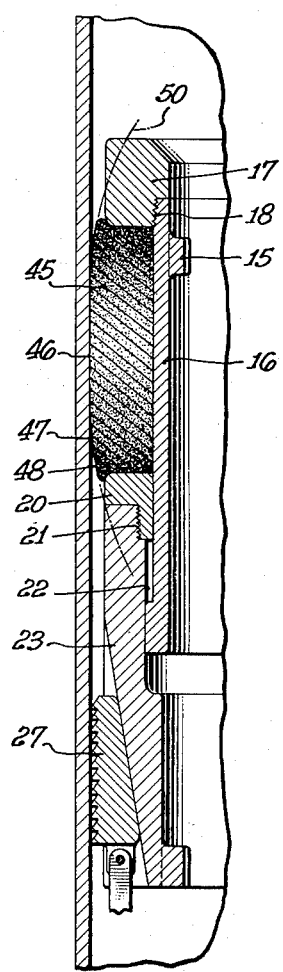

Patented Oct. 7, 1952

2,612,953

UNITED STATES PATENT OFFICE 2,612,953

PACKER

Charles K. Morgan and Lorrain D. Meddick, Los Angeles, and John S. McKenna, Alhambra, Calif., assignors to Lane-Wells Company, Los Angeles, Calif., a corporation of Delaware Application May 4, 1946, Serial No. 667,316

4 Claims. (Cl. 166—12)

This invention relates generally to packing devices for wells and particularly to packing ring or sleeve bodies employed for packing-off or sealing between concentric pipes or between tubing and casing within wells. This invention finds its most important application in meeting and overcoming difficulties encountered in well packing operations employed in present-day, extremely deep oil wells where conditions of unprecedented severity are encountered, including the combined, destructive effects of high temperatures and high pressures.

Oil well drilling trends over the past few years have been toward ever increasing depths, and the attendant increase in operating temperatures and pressures encountered in such wells, where packing operations must be performed, has resulted in a corresponding increase in the frequency of packer failures. Such packer failures have been due to improper materials and design of the resilient packer elements employed. For example, when rubber packing elements were employed in the conventional packer devices and where axial compressive forces through the tubing were employed to deform or expand the packer ring into sealing engagement with a surrounding casing, if the hardness index of the rubber was sufficiently low to be thus expanded by inexcessive compressive forces, then failure of such packer often occurred, under high temperature and high pressure conditions by extrusion and the resultant escape of the packer material from the packer. If, on the other hand, the hardness index of the rubber was sufficiently high to resist extrusion, then excessive compressive forces were required to deform the ring into proper sealing engagement with the casing wall, resulting often in failure of the tubing through which the compression was applied, or failure of the packer ring by cracking, and eventual disintegration. Furthermore, if insufficient force could be brought to bear on the hard packer to attain an adequate seal, then failure often occurred by cutting or channeling out as a result of leakage. Neither hard rings nor soft rings nor any ring having intermediate hardness ratings appeared alone capable of meeting the physical requirements desired for both durability and packer setting forces.

It is, therefore, an object of this invention to overcome the hereinbefore described difficulties encountered in connection with conventional packer elements under high pressure, high temperature conditions.

It is another object of this invention to provide a packer unit having the characteristics of high hardness rating, yet capable of forming a durable seal with moderate setting pressures.

It is a further object of this invention to provide a packer unit possessing the durability characteristics of high hardness, yet having the setting force characteristics of one employing packer elements of relatively low hardness rating.

It is a still further object of this invention to provide a packer having a wide range of adaptability to different well conditions permitting satisfactory sealing by the same packer, whether the packer is set at shallow depths, under low temperature conditions, with light tubing weight or at extreme depth, under high temperature and pressure conditions with relatively great tubing weight.

The objects, in general, are accomplished by the invention which, in its broadest aspect, resides in constructing and employing a resilient packer unit adapted to be subjected to axial compressive forces in a packer device to deform or expand it radially into sealing engagement with a surrounding casing wall, said packer unit being compounded, constructed or assembled in such fashion as to have hardness characteristics or rigidity values which vary therethrough from end to end.

These and other objects, advantages, and features of novelty will be evident hereinafter.

In the drawings, which show by way of illustration, preferred embodiments of the invention, and in which like reference numerals designate the same or similar parts throughout the several views:

Figure 1 is an elevational view in partial longitudinal section of the general assembly of typical packer apparatus in set condition within a casing, illustrating the action of conventional packer bodies.

Figure 2 is a fragmentary detail view in partial longitudinal section, of a portion of the packer apparatus of Figure 1 showing the packer elements of the invention in place in unset condition.

Figure 3 is a detail view, in partial longitudinal section, of the apparatus of Figure 2 illustrating the action of the packer body of the invention in an initial stage of setting.

Figure 4 is a detail view in partial longitudinal section of the apparatus of Figure 2, illustrating the action of the packer body of the invention in a final stage of the setting operation.

Figure 5 is a detail view, in partial longitudinal section of a modified form of the packer body of the invention in place in the packer apparatus in unset condition.

Figure 6 is a detail view in partial longitudinal section, of the apparatus of Figure 5 in a final stage of the setting operation.

Referring now primarily to Figure 1, in which a portion of a typical packer mechanism of the class with which the present invention is concerned, is illustrated, 10 is a packer head which carries through threaded joint 11 a hollow mandrel 12 which extends concentrically downward through the packer and slip assemblies. The packer head is adapted to make threaded coupling at 13 with suitable drill pipe or oil tubing 14 by means of which the packer apparatus is suspended while being lowered through the well casing and by means of which downward force is applied to expand the packer bodies into sealing engagement with a surrounding casing after the packer is set.

Concentrically surrounding the mandrel 12 and slidably spaced therefrom by means of a plurality of radial spacer webs 15 integral therewith, is a packer supporting sleeve 16 terminating at its upper end in an annular valve seat member 17 which makes threaded connection therewith at 18.

The lower portion of the packer supporting sleeve 16 extends downward slidably through a packer retaining nut 20 which, in turn, makes threaded connection at 21 with the upper end of a slip cone body 23. A resilient packer sleeve or a plurality of resilient packer rings encircle the supporting sleeve 16, are retained in position thereon, and are adapted to be axially compressed between the inner confronting surfaces of the beforementioned valve seat member 17 and the retaining nut 20 as shown generally at 25.

When the packer body 25 is thus compressed, as shown in Figure 1, into sealing engagement with a surrounding casing wall 26, the packer sleeve 16 slides downward through the retaining nut 20 and telescopically within the counterbore 22 of the slip cone body 23.

When the packer is set in the manner illustrated in Figure 1, a plurality of slips of conventional design, or other suitable means, makes gripping engagement between the inside surface of a surrounding casing 26 and the slip cone 23 as shown at 27, thereby supporting the retainer nut 20 immovable in the casing against downward compressive force applied thereto through the packer 25, the valve seat 17, and the packer head 10 by means of the tubing (not shown).

The operation of the packer mechanism, including the method of releasing and setting the slips 27, is well-known in the art and, for this reason, is not further described herein. A more complete description of the construction of the mechanical features and of the operation of this type of packer which is suitable to the present invention, is shown and disclosed in the United States patent to Renouf 2,005,955.

While a circulation type of casing packer mechanism is shown and described herein as a preferred apparatus to which the present invention is applicable, it is not so limited, since the present invention is applicable to advantage in any type of casing packer which operates in a manner similar to that herein illustrated to expand or deform a resilient packer body radially into sealing engagement with a surrounding casing by means of axial compressive force applied thereto.

In Figures 2 to 6, inclusive, the same type of packer apparatus illustrated in Figure 1 is employed, but for the purpose of convenience and clarity, only the valve head member 17, packer sleeve 16, retainer nut 20, and a portion of the slip cone body 23 have been shown, the balance of the packer mechanism having been omitted from the drawings.

Referring again to Figure 1, a typical type of packer failure which occurs under the severe conditions hereinbefore described when employing packer sleeves or packer ring elements of conventional type and composition in a set packer, is there illustrated. The outermost or end packer rings 30 and 31 have commenced to be extruded, as shown at 32 and 33, axially through the annual clearance spaces formed between the valve seat member 17, the slip cone body 23 on the inside, and the surrounding casing 26 on the outside. The intermediate packer rings have also commenced to flow toward the annular openings.

It may appear to those unskilled in the art that the most obvious method of preventing this type of packer failure would be to reduce these clearances between the outside diameter of the packer confining members such as the valve seat member 17 and the retainer nut 20, and the inside diameter of the casing 26 sufficiently to obviate such axial flow and extrusion of the packer material from confinement within the packer. This method of preventing packer failure, however, cannot be employed for the reason that it has been found by experience that the clearance spaces between the outside of these elements of the packer and the inside surface of the casing must always be relatively large. In other words, it has been found by those skilled in this art that it is impractical to reduce the clearance spaces sufficiently to overcome these packer difficulties, and yet safely pass the packer body through the casing into the well. The outside diameter of the packer confining elements must of necessity be considerably less than the drift diameter rating of the casing in which the packer is employed and usually not over approximately 95 per cent of the inside diameter of the casing.

It has been discovered, however, that by modification of the packer sleeve or packer ring characteristics, it is possible to maintain adequate clearances between the packer and the casing and, at the same time, to substantially eliminate packer failure.

Reference is now made primarily to Figures 2, 3, and 4 wherein the novel characteristics and construction of the packer body which is the feature of this invention, is illustrated.

It has been discovered that if the series of packer rings which are carried by the supporting sleeve 16, and which are confined and may be compressed into sealing engagement with the surrounding casing between the valve seat member 17 and the packer retainer nut 20 are composed of natural rubber, synthetic rubber, or other suitable rubber-like material which have been compounded and cured to possess different rigidity or hardness indices (Shore hardness), beneficial results in the way of increased durability and sealing efficiency are realized.

It has been discovered that preferably the end rings as illustrated at 35 and 36 in Figure 2, should have the highest hardness index and the intermediately located rings lower hardness indices. Of the intermediate rings, between the end rings, it has been found desirable that the outermost ones of these, as shown at 37 and 38, have higher hardness indices than the next innermost adjacent ones shown, for example those at 39 and 40. In other words, it has been discovered that preferably, the hardness indices of the packer rings should be graduated from higher values to lower values, from ring to ring from the outermost end rings toward the center section of the series of packer rings.

Figure 2 illustrates such a series of packer rings of various hardness indices as they appear at the initial running-in and unset condition. In Figure 2 and in the others, the approximate relative hardness differences of the packer rings is illustrated by the relative density differences of the cross-sectional representations.

In Figure 3, the appearance of the series of packer rings of this invention is illustrated at either an initial stage of the packer setting operation, or under set conditions where only light tubing weight is brought to bear upon the packer. Under this condition, the softest packer rings, namely the middle rings illustrated at 39 and 40, are deformed to the greatest extent and thus first come into sealing engagement with the inside wall surface of the casing 26. The next outermost ring in order of arrangement from the center of the series outward, namely rings 37 and 38, being harder than the inner or middle rings 39 and 40 are deformed to a lesser degree, but yet sufficiently to expand into position to serve as axial supporting shoulders against further axial deformation or extrusion of the softer, inner rings 39 and 40 through the thus reduced clearance space along the inside surface of the casing. The outermost rings 35 and 36 being, as before stated, the hardest ones in the series, undergo still less deformation and expansion, but, nevertheless, sufficient to serve in turn to support the adjacent rings 37 and 38 against excessive axial extrusive displacement.

Thus, it is apparent that, under the conditions illustrated in Figure 3, where adjacent rings are of progressively different hardnesses, only relatively small deformation increments occur from ring to ring, which deformations are distributed approximately along a sloping or curved line or in arch-like arrangement as indicated by the broken line 42, such distribution being dependent upon the rate of change of hardness differences.

In Figure 4, the appearance of the series of packer rings of this invention is illustrated at either the final stage of the packer setting operation, or where the packer is set at great depth within the well casing, possibly also under high temperature conditions where a relatively high tubing weight is brought to bear upon the packer. Under this latter condition, the softest packer rings at the intermediate sections of the series are forced into firm sealing engagement with the inside surface of the casing 26. The outermost rings, namely rings 35 and 36, being harder than the inner rings 37, 38, 39, and 40 may be deformed to lesser degree, yet, as in the former condition illustrated in Figure 3, they are expanded sufficiently to serve as adequate longitudinal supports for the adjacent, inner rings 37 and 38, substantially to close the end clearance spaces and thereby substantially to prevent axial flow.

Here again it is apparent that under the conditions illustrated in Figure 4 where the adjacent rings are of different hardnesses, only relatively small deformation and expansion increments occur from ring to ring outside of that portion which is completely deformed into sealing contact with the inside surface of the casing.

While, for the purpose of simplicity in illustration and also because this number has been found as a practical matter to be usually sufficient, only six packer ring elements have been illustrated in the packer body. However, in some cases where the packer must operate under extreme conditions of temperature and pressure, it has been found desirable to increase somewhat the number of rings employed. The reason for such increase in the number of rings employed is evident from the illustration in Figure 4 where it may be seen that as the axial pressure of the packing body is increased, a limiting condition is reached in the effectiveness of this arrangement where all of the rings, including the outermost ones, are brought into complete engagement with the inside surface of the casing, after which extrusion of the outermost rings along the casing wall commences. To prevent this and to extend the service limits to which the packer may be employed, additional rings of further increased hardnesses may be added at each outer end of the series of rings. Thus, a number of the outermost, hardest rings may be prevented from being deformed into complete engagement with the inside surface of the casing to thus preserve the arch-like distribution of increments of deformation from ring to ring.

In Figures 5 and 6 in which a modified form of the invention is illustrated, the beforementioned increase of numbers of ring elements in the series in the packer body may be considered to have been carried to the ultimate limit in which the packer body 45 takes the form of a single sleeve-like cylindrical element having hardness characteristics or rigidity values which, instead of varying stepwise from ring to ring as where the packer is composed of a plurality of rings, vary axially therethrough continuously from end to end, the hardest portions being at the ends and the softest portions at an intermediate section. The packer body 45 may thus be considered to comprise an infinite number of packer ring elements placed axially end to end with infinitesimal hardness differences from ring element to ring element. This variation in rigidity or hardness from outer ends toward the intermediate section is illustrated approximately by the variation in density of the cross-sectional representation.

In Figure 5, the single piece packer body 45 is illustrated in the unset, running-in condition corresponding to that illustrated in Figure 2 hereinbefore described.

In Figure 6, the single piece packer body 45 is shown under a typical set condition within the casing 26, which condition may correspond to conditions hereinbefore described in connection with Figure 4, where the intermediate portions of the packer body are first deformed into firm sealing engagement with the inside surface of the casing, as shown at 46. At the harder end regions of the packer body 45, however, the deformation there is insufficient to bring the packer into contact with the casing, and thus at some point depending upon the hardness distribution and the forces applied, the packer body leaves contact with the inside surface of the casing, as illustrated at 47. The outer surface of the packer body or sleeve 45 extending from that point of leaving contact with the inside surface of the casing 47 towards the opposite ends thereof, forms a curved shaped surface at 48 lying along a curved line or arch, as indicated by the broken line 50 in a manner comparable to that shown at 42 in Figure 3. Thus, the outer curved end portions comprise, in effect, an infinite number of shoulders or offsets in diameter, lying along the beforementioned curve 50. Self-support is thus effectively provided for the inner, softer portions of the packer against axial flow or extrusion.

By employing the construction illustrated in Figures 5 and 6 wherein the single sleeve-like packer body 45 has hardness characteristics varying toward increased hardness from the intermediate sections thereof towards the ends and by the choice of the rate of variation of hardness, it is apparent that the packer can be made adaptable to a wide range of variation in packer setting forces and still preserves the end deformation conditions conducive to stability, strength, and durability.

In a six-ring packer element, as illustrated in Figures 2, 3, and 4, the following relative hardness and tensile strength characteristics have been found suitable for most conditions. The innermost two rings may have Shore Durometer hardnesses of from approximately 73 to 77; the next outermost rings, Shore hardnesses of approximately 82 to 86, and the outermost end rings Shore hardnesses of approximately 88 to 92.

Materials which have been found most suitable for these packing rings are Hycar (M 76) and neoprene (100 G. N.). Hycar is a trade name for material manufactured by the Hycar Chemical Company, Akron, Ohio. The numbers in parentheses are batch designations for these materials as compounded by the Kirkhill Rubber Company, Los Angeles, California.

It has been found that the synthetic rings of these types and of these materials have less tendency to become vulcanized to the casing than natural rubber, and thus are more easily removed from the well casing.

In the packer body construction of the type illustrated in Figures 5 and 6, the physical characteristics of the material may be varied between a Shore hardness of approximately 70 at the intermediate section to a Shore hardness of approximately 100 at the opposite ends. The ring is thus adapted to be employed under substantially all of the extreme variations encountered from well to well in the field.

In general, where the terms rigidity and hardness have been used herein in the specification and claims in connection with the physical characteristics of the packer materials, these terms are meant to include that property of the material which resists elastic or plastic deformation thereof at right angles to the direction of application of the deforming force, for example that property of the packer sleeve or ring element which resists radial expansion in response to axial compressive force, or resists bending, extrusion or flow under applied shearing forces. While such hardness or rigidity properties may in the case of natural rubber, under normal temperature conditions, be highly elastic or resilient in nature, they may be less so in synthetic rubber and may even approach non-elastic plasticity in the case of some suitable plastic materials.

It is to be understood that the foregoing is illustrative only, and that the invention is not limited thereby, but may include various modifications and changes made by those skilled in the art without departing from the spirit and scope of the invention as defined in the appended claims.

We claim:

1. In a well packer adapted to be lowered into a well casing in unset condition with substantial clearance between the packer and the inner surface of the casing and having packer elements to be expanded radially for making sealing contact with the casing and maintaining such sealing contact in a deep well under severe temperature and pressure conditions tending to cause extrusion and flow of the packing material: an inner packer retainer sleeve; a series of separate, resilient, substantially rectangular cross-sectioned annular packer elements in end to end coaxial relationship surrounding said sleeve, each individual packer element being of substantially uniform Shore hardness and rigidity throughout but with different packer elements being of different Shore hardness and rigidity; the endmost packer elements of said series having the greatest Shore hardness and rigidity and the intermediate packer elements having lesser Shore hardness and rigidity, said endmost packer elements being less readily deformable than said intermediate packer elements under normal compressive forces applied thereto to expand the packer elements; and means for applying axial compressive forces to the endmost packer elements and through said series of packer elements to compress said packer elements axially on said sleeve and to thereby cause differential radial expansion of said packer elements toward a surrounding well casing with the intermediate packer elements partaking of the greatest initial radial expansion.

2. A well packer as defined in claim 1 in which the minimum Shore hardness of a packer element is from approximately 73 to 77 and in which the maximum Shore hardness of a packer element is from approximately 88 to 92.

3. In a well packer adapted to be lowered into a well casing in unset condition with substantial clearance between the packer and the inner surface of the casing and having packer elements to be expanded radially for making sealing contact with the casing and maintaining such sealing contact in a deep well under severe temperature and pressure conditions tending to cause extrusion and flow of the packing material: an inner packer retainer sleeve; a series of separate, resilient, substantially rectangular cross-sectioned annular packer elements in end to end coaxial relationship surrounding said sleeve, each individual packer element being of substantially uniform Shore hardness and rigidity throughout but with different packer elements being of different Shore hardness and rigidity; the endmost packer elements of said series having the greatest Shore hardness and rigidity and the intermediate packer elements positioned successively inwardly from said endmost elements having progressively lesser Shore hardness and rigidity, said endmost packer elements being less readily deformable than said intermediate packer elements under normal compressive forces applied thereto to expand the packer elements; and means for applying axial compressive forces to the endmost packer elements and through said series of packer elements to compress said packer elements axially on said sleeve and to thereby cause differential radial expansion of said packer elements toward a surrounding well casing with the intermediate packer elements partaking of the greatest initial radial expansion.

4. A well packer as defined in claim 3 in which the minimum Shore hardness of a packer element is from approximately 73 to 77 and in which the maximum Shore hardness of a packer element is from approximately 88 to 92.

CHARLES K. MORGAN.
        LORRAIN D. MEDDICK.
        JOHN S. McKENNA.

REFERENCES CITED

The following references are of record in the file of this patent:

UNITED STATES PATENTS

| Number | Name | Date |
| --- | --- | --- |
| 1,928,259 | McCabe | Sept. 26, 1933 |
| 2,005,955 | Renouf | June 25, 1935 |
| 2,058,103 | Phipps | Oct. 20, 1936 |
| 2,125,665 | Bettis | Aug. 2, 1938 |
| 2,205,910 | Raybould | June 25, 1940 |
| 2,420,226 | Claus | May 6, 1947 |